United States Patent

Yoshikawa et al.

[11] Patent Number: 6,146,320
[45] Date of Patent: Nov. 14, 2000

[54] CONDUCTIVE ROLL

[75] Inventors: Hitoshi Yoshikawa; Shoji Arimura, both of Komaki; Kunio Ito, Kasugai; Sumio Oinuma, Tajimi; Akihiko Kaji, Komaki; Kenichi Ohkuwa, Inuyama; Kazuhiro Takeda, Komaki; Satoshi Suzuki, Kasugai, all of Japan

[73] Assignee: Tokai Rubber Industries, Ltd., Komaki, Japan

[21] Appl. No.: 09/362,105

[22] Filed: Jul. 28, 1999

[30] Foreign Application Priority Data

| Jul. 28, 1998 | [JP] | Japan | 10-213167 |
| Mar. 2, 1999 | [JP] | Japan | 11-054579 |
| Mar. 18, 1999 | [JP] | Japan | 11-074487 |
| Jun. 11, 1999 | [JP] | Japan | 11-164675 |
| Jul. 22, 1999 | [JP] | Japan | 11-207172 |
| Jul. 26, 1999 | [JP] | Japan | 11-211157 |

[51] Int. Cl.$^7$ .................................................. B23P 15/00
[52] U.S. Cl. ............................................. 492/56; 492/59
[58] Field of Search ........................ 492/56, 59; 428/35.8, 428/36.91, 447, 448, 450

[56] References Cited

U.S. PATENT DOCUMENTS

| 5,409,995 | 4/1995 | Iwahara et al. |  |
| 5,541,001 | 7/1996 | Vreeland et al. | 492/56 |
| 5,567,833 | 10/1996 | Iwahara et al. |  |
| 5,580,925 | 12/1996 | Iwahara et al. |  |
| 5,582,885 | 12/1996 | Nakamura et al. | 492/56 |
| 5,587,245 | 12/1996 | Visser et al. | 428/447 |
| 5,654,052 | 8/1997 | Visser et al. | 428/35.8 |
| 5,733,235 | 3/1998 | Waku et al. | 492/56 |
| 5,736,250 | 4/1998 | Heeks et al. | 492/56 |

FOREIGN PATENT DOCUMENTS

| 6-51622 | 2/1994 | Japan . |
| 8-267612 | 10/1996 | Japan . |

*Primary Examiner*—Irene Cuda
*Attorney, Agent, or Firm*—Armstrong, Westerman, Hattori, McLeland & Naughton

[57] ABSTRACT

A conductive roll available at low cost and superior both in moldability and compression set and having small dispersion or fluctuation in electrical resistance includes a shaft and a base rubber layer formed on a peripheral surface of the shaft, the base rubber layer formed of a composition containing the following components (A) to (C): (A) a liquid polymer having a structural unit ($\alpha$) derived from at least one of butadiene and isoprene and having an alkenyl group in a side chain thereof; (B) a hydrosilylation crosslinking agent; and (C) a hydrosilylation catalyst. In the conductive roll the alkenyl group of the structural unit ($\alpha$) in the liquid rubber (component A) becomes a crosslinking site and is present in a molecule thereof as a so-called pendant form so that the base rubber layer as a crosslinked mold comes to have a dense net structure due to the effects by the hydrosilylation crosslinking agent (component B) and the hydrosilylation catalyst (component C), thereby to obtain good copied images.

10 Claims, 1 Drawing Sheet

CONDUCTIVE ROLL

FIELD OF THE INVENTION

The present invention relates to a conductive roll to be used as a developing roll, a charging roll, a transfer roll, an electrification-deleting roll, a fuser roll, a toner charging roll, a toner supply roll, a cleaning roll or the like in an electrophotographic apparatus such as a copying machine, a printer or a facsimile.

PRIOR ART

Copying or printing by an electrophotographic apparatus such as a copying machine, a printer and the like is generally conducted in the following manner. First, an electrostatic latent image of an original image is made on a photosensitive drum rotating on a shaft and toner is attached to the electrostatic latent image for forming a toner image. Then, the toner image was transferred to a sheet of paper, for obtaining a final copy or a final print. In this case, the original image is projected through an optical system on a preliminary charged surface of the photosensitive drum and electrification is canceled on a portion where light is applied, for obtaining an electrostatic latent image. As a charging method prior to formation of the electrostatic latent image, such a roll charging method that a charging roll directly contacts a photosensitive drum surface so as to charge the surface has been recently used. Further, as a method for forming the toner image on thus obtained electrostatic latent image on the photosensitive drum surface, a method using a developing roll (a contact developing method) has been used. In this method, toner is attached to a developing roll surface by friction charging and the toner is transferred from the developing roll to the electrostatic latent image of the photosensitive drum for forming a toner image on the photosensitive drum surface. The toner image is transferred on a sheet of paper by a transfer roll and the toner is melted by a fuser roll so as to be pressed on the sheet, for obtaining a copied image.

Such a conductive roll to be used as a developing roll, a charging roll or a transfer roll or the like in an electrophotographic apparatus, may comprise, for example, a shaft, a base rubber layer formed on a peripheral surface of the shaft, an intermediate layer formed on a peripheral surface on the base rubber layer and a surface layer formed on a peripheral surface of the intermediate layer. As a material for forming the base rubber layer, a liquid material is generally used from a viewpoint of moldability. Among all, it is known that a liquid composition consisting essentially of silicone rubber is optimum.

However, silicone rubber is not suitable for commercial use due to its high cost. For this reason, an ethylene-propylene-diene terpolymer (EPDM) available at lower cost has been used. However, a composition consisting essentially of the EPDM has a high molecular weight and thus low fluidity, which may result in a problem of moldability. To solve the problem, the EPDM is used making it less viscous by adding a large amount of oil thereto, however, even a base rubber layer formed by such an EPDM has an inferior compression set, good copied images cannot be obtained.

In view of the foregoing, it is an object of the present invention to provide a conductive roll available at low cost, superior both in moldability and compression set and having a small dispersion or fluctuation in electrical resistance, to obtain good copied images.

In accordance with the present invention, there is provided a conductive roll comprising a shaft, and a base rubber layer formed on a peripheral surface of the shaft, the base rubber layer formed of a composition containing the following components (A) to (C):

(A) a liquid polymer having a structural unit ($\alpha$) derived from at least one of butadiene and isoprene and having an alkenyl group in a side chain thereof;

(B) a hydrosilylation crosslinking agent; and (C) a hydrosilylation catalyst.

SUMMARY OF THE INVENTION

The inventors of the present invention have made intensive studies on materials for forming the base rubber layer to obtain a conductive roll available at low cost and superior both in moldability and compression set, to obtain good copied images. As a result, they found out that a liquid polymer (component A) having a structural unit ($\alpha$) derived from at least one of butadiene or isoprene and having an alkenyl group as a side chain is provided with a moldability as excellent as the liquid silicone, and is also available at lower cost than the liquid silicone. Further, they found out that since the alkenyl group of the structural unit ($\alpha$) in the liquid rubber (compound A) becomes a crosslinking site and is present in a molecule thereof as a so-called pendant form, the base rubber layer as a crosslinked mold comes to have a dense net structure due to the effects by the hydrosilylation crosslinking agent (component B) and the hydrosilylation catalyst (component C), resulting in superior compression set. As a result, they found out that good copied images can be obtained by using a conductive roll wherein the base rubber layer comprises a composition containing the specific liquid rubber (component A), the hydrosilylation crosslinking agent (component B) and the hydrosilylation catalyst (component C), and attained the present invention.

Further, where the specific hydrosilylation crosslinking agent (component B) represented by at least one general formula selected from the group consisting of the following general formulae (1) to (3) is used, compatibility and miscibility with the liquid polymer (component A) is improved so that compression set and shelf life (hardness) of the liquid rubber are improved.

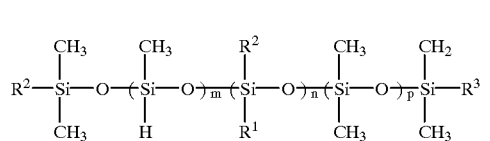

(1)

wherein $R^1$ is a hydrocarbon group having 2 to 20 carbon atoms, $R^2$ is a hydrocarbon group having 1 to 20 carbon atoms, $R^3$, which may be the same or different for each unit, is a hydrogen atom or a methyl group, and m, n and p satisfy $2 \leq m+n+p \leq 200$ wherein m is a positive number of 1 or more, n is a positive number of 1 or more and p is 0 or a positive number.

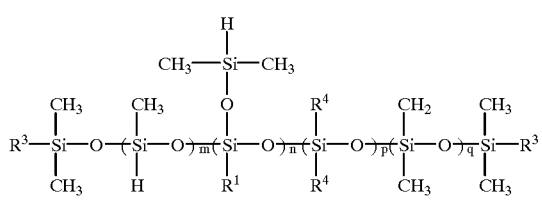

(2)

wherein $R^1$ is a hydrocarbon group having 2 to 20 carbon atoms, $R^3$, which may be the same or different for each unit, is a hydrogen atom or a methyl group, $R^4$, which may be the same or different for each unit, is a hydrocarbon group having 1 to 20 carbon atoms, and m, n, p and q satisfy $1 \leq m+n+p+q \leq 200$ wherein m is 0 or a positive number, n is a positive number of 1 or more, p is 0 or a positive number and q is 0 or a positive number.

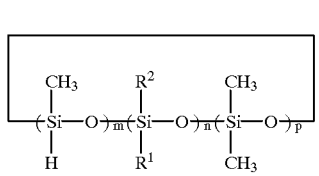

(3)

wherein $R^1$ is a hydrocarbon group having 2 to 20 carbon atoms, $R^2$ is a hydrocarbon group having 1 to 20 carbon atoms and m, n and p satisfy $3 \leq m+n+p \leq 50$ wherein m is a positive number of 2 or more, n is a positive number of 1 or more and p is 0 or a positive number.

Still further, where the liquid rubber (component A) has the structural unit (β) derived from styrene along with the structural unit (α), dispersibility of carbon black can be improved, dispersion in electrical resistance lessens and also it is not necessary to conduct corona discharge treatment, primer treatment or the like on the surface of the shaft, which is required where the liquid silicone rubber is used as a material for forming the base rubber layer.

Even still further, where a specific conductive carbon black is used for forming the base rubber layer along with the components (A) to (C), a crosslinking reaction can satisfactorily occur.

In addition, where the carbon black having silica fixed on the surface thereof is used for forming the base rubber layer along with the components (A) to (C), dispersibility of the carbon black in the liquid polymer (component A) is improved, dispersion in electrical resistance lessens so that shelf life (electrical resistance) of liquid rubber is improved, resulting in more excellent copied images.

DETAILED DESCRIPTION OF THE INVENTION

The present invention will hereinafter be described in detail by way of embodiments thereof.

Figure 1:
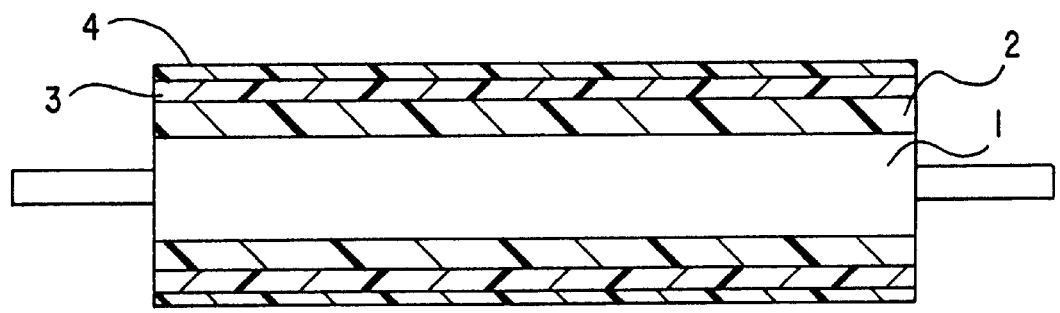
FIG. 1 is a sectional view illustrating one embodiment of a conductive roll of the present invention.

FIG. 1 shows a conductive roll according to one embodiment of the present invention. The conductive roll comprises a shaft 1, a base rubber layer 2 formed on a peripheral surface of the shaft 1, an intermediate layer 3 formed on a peripheral surface of the base rubber layer 2 and a surface layer 4 formed on a peripheral surface of the intermediate layer 3. A main feature of the conductive roll according to the present invention is that the base rubber layer 2 is formed of a specific composition (a coating liquid).

The material and construction of the shaft 1 are not particularly limited. The shaft 1 may be, for example, a solid metal rod, a hollow metal cylinder or the like. Exemplary materials for the shaft 1 include stainless steels, aluminum, plated iron and the like. An adhesive, a primer or the like may, as required, be applied onto the shaft 1. Conductivity may, as required, be imparted to the adhesive, the primer or the like.

The base rubber layer 2 formed on the peripheral surface of the shaft 1 is formed of a specific composition (liquid polymer composition) containing the specific liquid polymer (component A), the hydrosilylation crosslinking agent (component B) and the hydrosilylation catalyst (component C).

The specific liquid polymer (component A) has a structural unit (α) derived from at least one of butadiene or isoprene and having an alkenyl group in a side chain thereof. The specific structural unit (α) is not particularly limited. Examples thereof include structural units represented by the following structural formulae (I) to (III). The alkenyl group (or a vinyl group, an isopropenyl group) in a side chain or the structural units is used for a crosslinking reaction so as to form a three dimensional net structure and to show rubber-like elasticity.

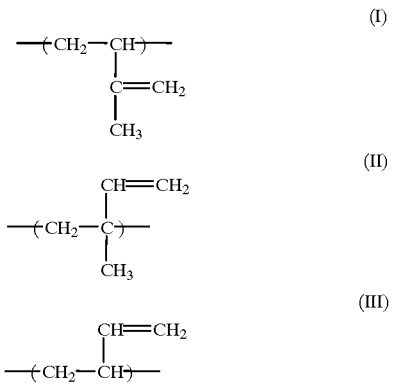

Examples of the liquid polymer (component A) having the specific structural unit (α) include isoprene rubber (IR), butadiene rubber (BR), IR-BR copolymer rubber and the like. These may be used either alone or in combination.

Alternatively, the specific liquid polymer (component A) may have a structure unit (β) derived from styrene along with the specific structural unit (α). The styrene may have a substituent. As a substituent, an alkyl group is preferred, among which the alkyl group having 1 to 5 carbon atoms is preferred. Examples thereof include a methyl group, an ethyl group, a propyl group, an isopropyl group, a butyl group, an isobutyl group, a sec-butyl group and a tert-butyl group.

Among the liquid polymers (component A) having the structural units (α) and (β), an isoprene-styrene copolymer rubber represented by the following general formula (IV) is preferably used.

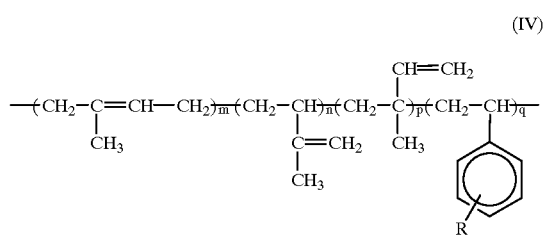

wherein R is a hydrogen atom or an alkyl group having 1 to 5 carbon atoms, m is 0 or a positive number, n is a positive number, p is 0 or a positive number and q is a positive number.

The proportion of the structural unit (α) in the specific liquid polymer (component A) is preferably within a range of 0.5 to 80% by weight of the total component (A), more preferably within a range of 1.5 to 20% by weight. When the proportion of the structural unit (α) is less than 0.5% by weight, a crosslinking reaction becomes insufficient so that stability of thus obtained crosslinked mold (the base rubber layer) may deteriorate. On the other hand, when the proportion thereof is greater than 80% by weight, a net structure by crosslinking may be too dense so that the crosslinked mold (the base rubber layer) becomes hard or brittle.

Further, when the liquid polymer (component A) has the structural units (α) and (β), the proportion of the structural unit (β) is preferably within a range of 5 to 30% by weight of the total component (A), more preferably 10 to 25% by weight. When the proportion of the structural unit (β) is less than 5% by weight, the effect due to styrene may not sufficiently be obtained, while when the proportion is greater than 30% by weight, the liquid polymer comes to have high viscosity, which may result in deterioration of moldability and compression set.

The specific liquid polymer (component A) may, for example, be produced in the following method. First, at least one of butadiene and isoprene, optionally styrene is prepared as monomer components. Then, the above monomer components are mono-polymerized or copolymerized in the presence of an appropriate catalyst (for example, lithium catalyst or Ziegler catalyst) by various methods such as anionic polymerization, for obtaining the specific liquid polymer (component A).

A number average molecular weight (Mn) of the specific liquid polymer (component A) is preferably within a range of 700 to 200,000, more preferably within a range of 2,000 to 100,000. When the number average molecular weight is within the above range, it is easy to treat the liquid polymer and a crosslinking reaction can suitably occur. Among all, when the liquid polymer (component A) has only the structural unit (α), a number average molecular weight (Mn) thereof is preferably within a range of 700 to 60,000, more preferably 2,000 to 50,000. When the liquid polymer (component A) has both the structural units (α) and (β), a number average molecular weight (Mn) thereof is preferably within a range of 1,000 to 100,000, more preferably 10,000 to 80,000.

The liquid polymer (component A) preferably has a viscosity of 100 to 3,000,000 cps/25° C., more preferably of 1,000 to 500,000 cps/25° C.

The hydrosilylation crosslinking agent (component B) is not particularly limited. Examples thereof include a hydrosilylation crosslinking agent having a hydrosilyl group in a molecule thereof. The hydrosilyl group means a silicon atom with at least one hand of four hands combined with a hydrogen atom.

Among the hydrosilylation crosslinking agents (component B), the hydrosilyl compound represented by the following general formulae (1) to (3) are preferably used from viewpoints of good compatibility and miscibility with the liquid polymer and improvement in compression set and shelf life (hardness) of the liquid rubber. In the following formulae (1) to (3), each repeating unit m, n, p and q may be in a form of a polymer such as a random polymer or a blocked polymer.

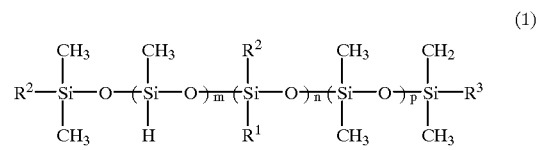

wherein $R^1$ is a hydrocarbon group having 2 to 20 carbon atoms, $R^2$ is a hydrocarbon group having 1 to 20 carbon atoms, $R^3$, which may be the same or different for each unit, is a hydrogen atom or a methyl group, and m, n and p satisfy $2 \leq m+n+p \leq 200$ wherein m is a positive number of 1 or more, n is a positive number of 1 or more and p is 0 or a positive number.

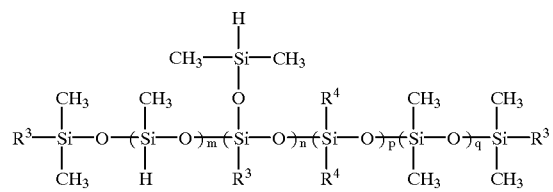

wherein $R^1$ is a hydrocarbon group having 2 to 20 carbon atoms, $R^3$, which may be the same or different for each unit, is a hydrogen group or a methyl group, $R^4$, which may be the same or different for each unit, is a hydrocarbon group having 1 to 20 carbon atoms, m, n, p and q satisfy $1 \leq m+n+p+q \leq 200$ wherein m is 0 or a positive number, n is a positive number of 1 or more, p is 0 or a positive number and q is 0 or a positive number.

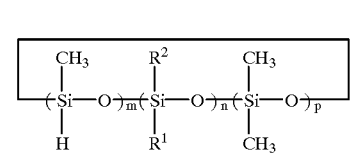

wherein $R^1$ is a hydrocarbon group having 2 to 20 carbon atoms, $R^2$ is a hydrocarbon group having 1 to 20 carbon atoms, and m, n and p satisfy 3≦m+n+p≦50 wherein m is a positive number of 2 or more, n is a positive number of 1 or more and p is 0 or a positive number.

The hydrosilyl compound represented by the above general formula (1) to (3) can be prepared, for example, by the following methods ① to ④, among which the method ③ is especially preferred due to its easiness.

① a method of reducing a chlorosilyl group into a hydrosilyl group by treating a hydrocarbon compound having a chlorosilyl group (SiCl) in a molecule thereof with a reductant (such as LiAlH$_4$ or NaBH$_4$).

② a method of reacting a hydrocarbon compound having a functional group with a compound having both a functional group and a hydrosilyl group able to be reacted with the functional group of the hydrocarbon compound.

③ a method of reacting a hydrocarbon compound having an alkenyl group with a polyhydrosilane compound in such a manner that a hydrosilyl group remains in a molecular structure of the reactant.

④ a method of reacting a cyclic siloxane having a hydrosilyl group and a cyclic siloxane having a hydrocarbon group.

Among thus obtained hydrosilyl compounds, the hydrosilyl compounds represented by the following structural formulae (4) to (8) are especially preferred. In the formulae (4) to (8), each repeating unit may be in any form of a polymer such as a random polymer or a blocked polymer.

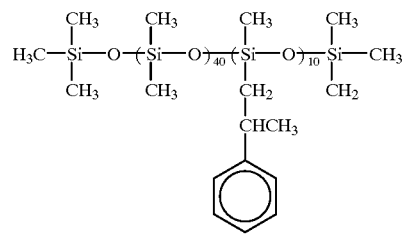

(4)

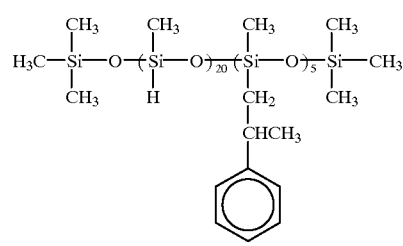

(5)

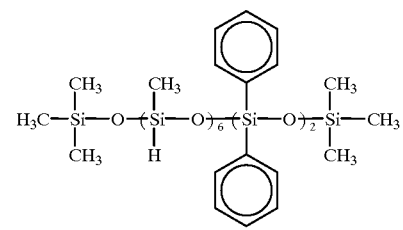

(6)

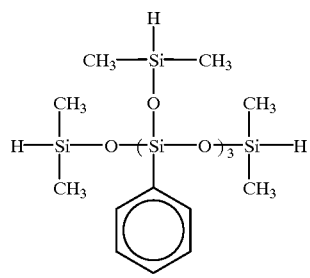

(7)

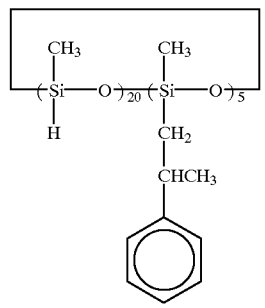

(8)

The hydrosilyl compound represented by the structural formula (4) may be, for example, prepared in the following reaction.

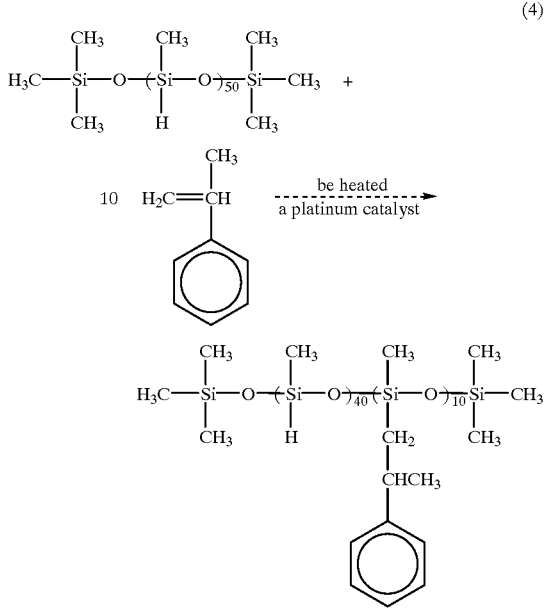

(4)

The proportion of the hydrosilylation crosslinking agent (compound B) is preferably within a range of 1 to 15 parts by weight (abbreviated to parts hereinafter) of 100 parts of the liquid polymer (component A), more preferably 2 to 8 parts. When the proportion is less than 1 part, crosslinking reaction does not sufficiently occur, resulting in deterioration of strength and compression set. When the proportion is greater than 15 parts, crosslinking reaction proceeds too much, resulting in a hard and brittle product or a shorter pot life.

The hydrosilylation catalyst (component C) used along with the specific liquid polymer (component A) and the hydrosilylation crosslinking agent (component B) is not particularly limited, as long as it can exhibit its catalyzing capacity in the crosslinking reaction. Examples thereof include chloroplatinic acid, a complex of chloroplatinic acid with alcohols, aldehydes, ketones or the like, a platinum/ vinylsiloxane complex, a platinum/olefin complex, a platinum/phosphite complex, a carrier, such as platinum, alumina, silica or carbon black, bearing a solid platinum. Examples of the catalyst other than the platinic compounds include a palladium compound, a rhodium compound, an iridium compound and a ruthenium compound. These may be used either alone or in combination.

Further, it is preferred that a conductive agent is appropriately added into the specific composition (liquid polymer composition) for forming the base rubber layer 2 along with the components (A) to (C). The conductive agent is not particularly limited. Examples thereof include conductive carbon black, potassium titanate, iron oxide, c-$TiO_2$, c-ZnO, c-indium oxide ('c' means conductive), such an ionic conductive agent as not to prohibit a crosslinking reaction (such as quaternary ammonium salt, borate, a surfactant, a metal ion, polyethylene oxide (PEO)). These may be used either alone or in combination. Among them, the conductive carbon black is preferred from a viewpoint of crosslinking reactivity.

It is preferred to use the conductive carbon black having ash at not more than 0.3% by weight from a viewpoint of crosslinking reactivity.

The proportion of the conductive roll is preferably within a range of 1 to 30 parts, more preferably 5 to 15 parts based upon 100 parts of the liquid polymer (component A).

A carbon black having silica fixed on the surface thereof (abbreviated to silica-treated carbon black hereinafter) is appropriately added into the specific composition (liquid polymer composition) for forming the base rubber layer 2 along with the components (A) to (C). The carbon black is herein defined in a broad sense and includes all carbon blacks produced by a furnace method and an impact method. Examples thereof include furnace black, lamp black (direct combustion black), thermal black (inactive black), acetylene black, hard black, soft black, channel black (active black), roller black, disc black, particle black, dense black and pellet black.

The silica-treated carbon black can be produced by the method in a gas phase as disclosed in WO96/37547, but may be, for example, produced by the following manner. First, the carbon black is dispersed into water and a dispersant (such as methanol and various surfactants) is added thereto, for obtaining a homogeneous slurry. Thus obtained slurry is adjusted so as to be not less than pH 6, preferably 10 to 11, and sodium silicate is hydrolyzed therein as the temperature thereof is kept at not less than 70° C., more preferably 85 to 95° C. so that amorphous silica is adhered or precipitated on a surface of the carbon black particles.

The proportion of silica ($SiO_2$) in silica-treated carbon black is preferably 1 to 25% by weight of the total silica-treated carbon black, more preferably 3 to 10% by weight. When the proportion is less than 1% by weight, an effect of preventing agglomeration in the polymer is insufficient. On the other hand, when the proportion exceeds 25% by weight, an effect for conductivity due to the carbon black lessens.

The proportion of the silica-treated carbon black is preferably 5 to 30 parts, more preferably 10 to 20 parts, based upon 100 parts of the liquid polymer (component A). When the proportion is less than 5 parts, dispersed carbon black scatters separately so that conductivity is difficult to exhibit and also cannot sufficiently prevent agglomeration of the carbon black. On the other hand, when the proportion exceeds 30 parts, a volume ratio of the carbon black increases in the liquid polymer so that viscosity increases, resulting in no fluidity.

An average particle diameter of the silica-treated carbon black is preferably 0.01 to 0.3 μm, more preferably 0.02 to 0.1 μm.

Further, a filler such as calcium carbonate, mica, silica or graphite, a plasticizer, oil, a crosslinking accelerator, a crosslinking retardant, an antioxidant and a colorant such as zinc oxide or titanium oxide may appropriately be added along with the above components into the specific composition (coating liquid) for forming the base rubber layer 2.

The specific composition (the liquid polymer composition) for forming the base rubber layer 2 may be, for example, prepared in the following manner. First, the liquid polymer (component A) and the hydrosilylation catalyst (component C) are mixed at appropriate proportions, for obtaining a main liquid agent, while a liquid hardener containing the hydrosilylation crosslinking agent (component B) is prepared. Further, other components are added to the main liquid agent or the liquid hardener, respectively, as required. The main liquid agent and the liquid hardener may be mixed for use. From a viewpoint of shelf stability, it is preferred that the main liquid agent and the liquid hardener are preserved, separately, and then the both liquids are mixed for use.

The material for forming the intermediate layer 3 formed on a peripheral surface of the base rubber layer 2 is not particularly limited. Examples thereof include acrylonitrile-butadiene rubber (nitrile rubber, abbreviated to NBR hereinafter), polyurethane elastomer, chloroprene rubber (CR), natural rubber, butadiene rubber (BR), butyl rubber (IIR), hydrin rubber (ECO, CO) and nylon. Among all, NBR is preferred from viewpoints of adhesive property and stability of a coating agent.

Further, a conductive agent, a crosslinking agent, a crosslinking accelerator, stearic acid, ZnO (zinc white), a softener or the like may be added to the material for forming the intermediate layer 3, as required. Examples of the conductive agent include carbon black, graphite, potassium titanate, iron oxide, C-$Tio_2$, c-ZnO, c-indium oxide ('c-' means conductive) and an ionic conductive agent (such as quaternary ammonium salt, borate, a surfactant).

The material for forming the surface layer 4 formed on the peripheral surface of the intermediate layer 3 is not particularly limited. Examples thereof include polyurethane elastomer, acrylic polymer and polyamide. These may be used either alone or in combination.

In addition, a conductive agent, a hardener or the like may be added to the material for forming the surface layer 4, as required.

The conductive roll of the present invention may be produced, for example, in the following manner. First, the liquid polymer composition (the main liquid agent and the liquid hardener) for forming the base rubber layer 2 is produced in the same manner as the above-mentioned. Then, each component for forming the intermediate layer 3 is kneaded by means of a kneader such as a roll and an organic solvent is added thereto and stirred, for obtaining the material (coating liquid) for forming the intermediate layer 3. The material (coating liquid) for forming the surface layer 4 is prepared in the above-mentioned manner.

Further, the main liquid agent and the liquid hardener as the material (liquid polymer composition) for forming the base rubber layer 2 is filled into an injection mold in which a solid metal rod as a shaft has been installed, and then heated and crosslinked at designated conditions, and then removed from the mold, for obtaining a base roll formed along a peripheral surface of the shaft. Next, the intermediate layer 3 is formed by applying the material (coating liquid) for forming the intermediate layer 3 onto a peripheral surface of the base rubber layer 2. Further, the surface layer 4 is formed by applying the material (coating liquid) onto a peripheral surface of the intermediate layer 3. Thus, the conductive roll (see FIG. 1) in three-layer structure can be produced, which comprises the base rubber layer 2, the intermediate layer 3 formed on the peripheral surface of the base rubber layer 2 and the surface layer 4 formed on the peripheral surface of the intermediate layer 3.

The molding method of the base rubber layer 2 is not particularly limited to the injection molding, but may be a cast molding or a press molding before grinding. The method of applying the coating liquid is not particularly limited, but may be a conventional method such as a dipping method, a spray coating method and a roll coating method.

The conductive roll of the present invention is suitable for a developing roll. However, it is not limited thereto, and may be used as a transfer roll, a charging roll, an electrification-deleting roll, a fuser roll, a toner charging roll, a toner supply roll, a cleaning roll or the like. Also, the structure of the conductive roll of the present invention is not limited to the three-layer structure, but an appropriate number of the layers may be formed, as long as the base rubber layer is formed of the above-mentioned specific polymer composition.

The thickness of each layer of the conductive roll according to the present invention may be suitably determined depending on the application thereof. For example, in the case that the conductive roll is used as a developing roll, the thickness of the base rubber is preferably within a range of 0.5 to 10 mm, more preferably within a range of 3 to 6 mm, the thickness of the intermediate layer is preferably within a range of 1 to 90 μm, more preferably 3 to 30 μm, and the thickness of the surface layer is preferably within a range of 3 to 100 μm, more preferably within a range of 5 to 50 μm.

Examples will hereinafter be described along with Comparative Examples.

EXAMPLE 1

Preparation of material for forming the base rubber

The liquid polymer composition was prepared in the above-mentioned manner by using 100 parts of liquid isoprene rubber (Liquid Isoprene Rubber, LIR-30 available from Kuraray Co., Ltd.) (Mn: 29,000, the proportion of the structural unit (α): 6.5% by weight) as the component (A), 5 parts of a hydrosilylation crosslinking agent represented by the following structural formula (9) (TSF484 available from Toshiba Silicone Co., Ltd.) as the component (B), 0.01 parts of a hydrosilylation catalyst (chloroplatinic acid) as the component (C), 12 parts of conductive carbon black (Denka black available from Denki Kagaku Kogyo Kabushiki Kaisha, ash content: 0.01% by weight) and 75 parts of a paraffin plasticizer (PW-150 available from Idemitsu Kosan Co., Ltd.).

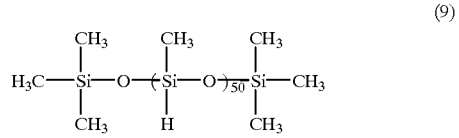

(9)

Preparation of the material for the intermediate layer

First, carbon black and a curing agent were added to hydrogenated nitrile rubber. The resulting mixture was solved into methyl ethyl ketone, for obtaining the material for forming the intermediate layer (coating liquid).

Preparation of the material for forming the surface layer 100 parts of polyurethane elastomer (Nippollan 2304 available from Nippon Polyurethane Industry Co., Ltd.), 20 parts of carbon black and 25 parts of a curing agent (Burnock D-750 available from Dainippon Ink and Chemicals Incorporated) were kneaded in the above-mentioned method. The resulting mixture was dispersed into an organic solvent, for obtaining the material (coating liquid) for forming the surface layer.

Production of a developing roll

The material (liquid polymer composition) for forming a base rubber layer was filled into an injection mold in which a solid metal rod (made of SUS304 with a diameter of 10 mm) as a shaft had been installed, and then heated and crosslinked at 160° C. for 2 minutes, and then removed from the mold, for obtaining a base roll wherein a base rubber layer was formed along a peripheral surface of the shaft. Next, the intermediate layer was formed by applying the material (coating liquid) for forming the intermediate layer onto a peripheral surface of the base rubber layer. Further, the surface layer was formed by applying the material (coating liquid) onto a peripheral surface of the intermediate layer. Thus, a developing roll with a three-layer structure was obtained, which comprises the base rubber layer, the intermediate layer formed on the peripheral surface of the base rubber layer and the surface layer formed on the peripheral surface of the intermediate layer. In addition, each thickness of the base rubber layer, the intermediate layer and the surface layer is 5 mm, 25 μm, and 10 μm, respectively.

EXAMPLE 2

The liquid polymer composition was prepared in the same manner as EXAMPLE 1, except that liquid isoprene rubber (Liquid Isoprene Rubber, LIR-50 available from Kuraray Co., Ltd.) (Mn: 47,000, the proportion of the structural unit (α): 6.8% by weight) was used instead of the liquid isoprene rubber (Liquid Isoprene Rubber, LIR-30 available from Kuraray Co., Ltd.) of EXAMPLE 1. Except that a base rubber layer was formed by using this liquid polymer composition, a developing roll was produced in the same manner as EXAMPLE 1.

EXAMPLE 3

The liquid polymer composition was prepared in the above-mentioned manner by using 100 parts of isoprene-butadiene copolymer rubber having a weight ratio of isoprene:butadiene=12.6:87.4 (Liquid Isoprene Rubber, LIR-390 available from Kuraray Co., (Ltd.) (Mn: 34,000, the proportion of the structural unit (α): 9.3% by weight) as the component (A), 5 parts of a hydrosilylation crosslinking agent (TSF484 available from Toshiba Silicone Co., Ltd.) as the component (B), 0.01 parts of a hydrosilylation catalyst (chloroplatinic acid) as the component (C), 18 parts of conductive carbon black (Degussa, Printex V, ash content: 0.02% by weight) and 75 parts of a paraffin plasticizer (PW-150 available from Idemitsu Kosan Co., Ltd.). Except that a base rubber layer was formed by using this liquid polymer composition, a developing roll was produced in the same manner as EXAMPLE 1.

EXAMPLE 4

The liquid polymer composition was prepared in the above-mentioned manner by using 100 parts of liquid isoprene rubber (Liquid Isoprene Rubber, LIR-30 available from Kuraray Co., Ltd.) (Mn: 29,000, the proportion of the structural unit (α): 6.5% by weight) as the component (A), 5 parts of a hydrosilylation crosslinking agent (TSF484 available from Toshiba Silicone Co., Ltd.) as the component (B), 0.01 parts of a hydrosilylation catalyst (chloroplatinic acid) as the component (C), 3 parts of conductive carbon black (Ketjen black EC, ash content: 0.1% by weight) and 30 parts of a paraffin plasticizer (PW-150 available from Idemitsu Kosan Co., Ltd.). Except that a base rubber layer was formed by using this liquid polymer composition, a developing roll was produced in the same manner as EXAMPLE 1.

EXAMPLE 5

The liquid polymer composition was prepared in the same manner as EXAMPLE 1, except that liquid butadiene rubber (B-3000 available from Nippon Oil Co., Ltd.) (Mn: 3,000, the proportion of the structural unit (α): 65% by weight) was used instead of the liquid isoprene rubber (Liquid Isoprene Rubber, LIR-30 available from Kuraray Co., Ltd.) of EXAMPLE 1. Except that a base rubber layer was formed by using this liquid polymer composition, a developing roll was produced in the same manner as EXAMPLE 1.

EXAMPLE 6

The liquid polymer composition was prepared in the above-mentioned manner by using 100 parts of liquid butadiene rubber (Liquid Isoprene Rubber, LIR-30 available from Kuraray Co., Ltd.) of (Mn: 40,000, the proportion of the structural unit (α): 9.4% by weight) as the component (A), 5 parts of a hydrosilylation crosslinking agent (TSF484 available from Toshiba Silicone Co., Ltd.) as the components (B), 0.01 parts of a hydrosilylation catalyst (platinic carbonyl complex, SIP 6829.0 available from Azmax Co., Ltd.) as the component (C), 10 parts of conductive carbon black (Denka black available from Denki Kagaku Kogyo Kabushiki Kaisha, ash content: 0.01% by weight) and 30 parts of a paraffin plasticizer (PW-150 available from Idemitsu Kosan Co., Ltd.). Except that a base rubber layer was formed by using this liquid polymer composition, a developing roll was produced in the same manner as EXAMPLE 1.

EXAMPLE 7

The liquid polymer composition was prepared in the same manner as EXAMPLE 6, except that an isoprene-butadiene copolymer rubber (Liquid Isoprene Rubber, LIR-390 available from Kuraray Co., Ltd.) was used instead of the liquid butadiene rubber (Liquid Isoprene Rubber, LIR-300 available from Kuraray Co., Ltd.) of EXAMPLE 6. Except that a base rubber layer was formed by using this liquid polymer composition, a developing roll was produced in the same manner as EXAMPLE 1.

EXAMPLE 8

The liquid polymer composition was prepared in the same manner as EXAMPLE 6, except that Isoprene-styrene copolymer rubber (Liquid Isoprene Rubber, LIR-310 available from Kuraray Co., Ltd.) was used instead of the liquid butadiene rubber (Liquid Isoprene Rubber, LIR-300 available from Kuraray Co., Ltd.) of EXAMPLE 6. Except that a base rubber layer was formed by using this liquid polymer composition, a developing roll was produced in the same manner as EXAMPLE 1.

EXAMPLE 9

The liquid polymer composition was prepared in the same manner as EXAMPLE 6, except that styrene-isoprene copolymer rubber having a weight ratio of styrene:isoprene= 5.95 (Mn: 30,000, the proportion of the structural unit (α): 3% by weight, the proportion of the structural unit (β): 5% by weight) was used instead of the liquid butadiene rubber (Liquid Isoprene Rubber, LIR-300 available from Kuraray Co., Ltd.) of EXAMPLE 6. Except that a base rubber layer was formed by using this liquid polymer composition, a developing roll was produced in the same manner as EXAMPLE 1.

EXAMPLE 10

The liquid polymer composition was prepared in the same manner as EXAMPLE 6, except that styrene-isoprene copolymer rubber having a weight ratio of styrene:isoprene= 30:70 (Mn: 30,000, the proportion of the structural unit (α): 3% by weight, the proportion of the structural unit (β): 30% by weight) was used instead of the liquid butadiene rubber (Liquid Isoprene Rubber, LIR-300 available from Kuraray Co., Ltd.) of EXAMPLE 6. Except that a base rubber layer was formed by using this liquid polymer composition, a developing roll was produced in the same manner as EXAMPLE 1.

EXAMPLE 11

The liquid polymer composition was prepared in the same manner as EXAMPLE 1, except that the hydrosilylation crosslinking agent represented by the above-mentioned structural formula (5) was used instead of the hydrosilylation crosslinking agent (TSF484 available from Toshiba Silicone Co., Ltd.) of EXAMPLE 1. Except that a base rubber layer was formed by using this liquid polymer composition, a developing roll was produced in the same manner as EXAMPLE 1.

EXAMPLE 12

The liquid polymer composition was prepared in the same manner as EXAMPLE 1, except that the hydrosilylation crosslinking agent represented by the above-mentioned structural formula (6) was used instead of the hydrosilylation crosslinking agent (TSF484 available from Toshiba Silicone Co., Ltd.) of EXAMPLE 1. Except that a base rubber layer was formed by using this liquid polymer composition, a developing roll was produced in the same manner as EXAMPLE 1.

EXAMPLE 13

The liquid polymer composition was prepared in the same manner as EXAMPLE 1, except that the hydrosilylation crosslinking agent represented by the above-mentioned structural formula (7) was used instead of the hydrosilylation crosslinking agent (TSF484 available from Toshiba Silicone Co., Ltd.) of EXAMPLE 1. Except that a base rubber layer was formed by using this liquid polymer composition, a developing roll was produced in the same manner as EXAMPLE 1.

EXAMPLE 14

The liquid polymer composition was prepared in the same manner as EXAMPLE 1, except that the hydrosilylation crosslinking agent represented by the above-mentioned structural formula (8) was used instead of the hydrosilylation crosslinking agent (TSF484 available from Toshiba Silicone Co., Ltd.) of EXAMPLE 1. Except that a base rubber layer was formed by using this liquid polymer composition, a developing roll was produced in the same manner as EXAMPLE 1.

COMPARATIVE EXAMPLE 1

The composition was prepared in the above-mentioned manner by using 100 parts of EPDM, 5 parts of a peroxide crosslinking agent, 80 parts of carbon black (Diablack #3030, available from Mitsubishi Chemical Corp.) and 75 parts of a paraffin oil. Except that a base rubber layer was formed under curing conditions of 160° C.×45 minutes by using this composition, a developing roll was produced in the same manner as EXAMPLE 1.

COMPARATIVE EXAMPLE 2

The composition was prepared in the above-mentioned manner by using 100 parts of EPDM, 5 parts of a peroxide crosslinking agent, 80 parts of carbon black (Diablack #3030, available from Mitsubishi Chemical Corp.) and 90 parts of a paraffin oil. Except that a base rubber layer was formed under curing conditions of 160° C.×45 minutes by using this composition, a developing roll was produced in the same manner as EXAMPLE 1.

Each property was evaluated by using developing rolls thus obtained in EXAMPLES and COMPARATIVE EXAMPLES in accordance with the following standards. These results are shown in the following TABLES 1 to 4.

Transferability of Mold

Each base rubber layer for forming an innermost layer was visually evaluated. ○ indicates that no defect in molding such as a dimple or a blister occur and reproduction of an outer periphery of the base rubber layer is good. While x indicates that defects in molding such as a dimple or blister occur and reproduction of an outer periphery of the base rubber layer is bad.

Hardness

The hardness (JIS A) of each base rubber layer was determined in accordance with JIS K 6301.

Compression Set

The compression set of each base rubber layer was determined in accordance with JIS K 6301. In addition, such determination was conducted at 70° C. for 22 hours with a compression ratio of 25%. When the measurement value of such determination is not more than 5%, compression set is excellent. However, when the value is not more than 8%, there is no problem caused for use.

Electrical Resistance

The electrical resistance of each base rubber layer was determined in accordance with JIS K 6911.

Dispersion of Electrical Resistance

The electrical resistance was measured at ten spots of the base rubber layer and was evaluated by log (the maximum value/the minimum value).

Shelf Life of Rubber
Electrical resistance

A liquid comprising the liquid polymer (component A) and the hydrosilylation crosslinking agent (component B), and a liquid comprising the liquid polymer (component A) and the hydrosilylation catalyst (component C) were separately prepared such that when they would be mixed in ratio of 1:1 the resulting mixture would have the three components in a designated ratio, and both liquids were allowed to stand at an ordinary temperature (25° C.) for three months. Thereafter, each supernatation and subsidence were withdrawn at 10% by weight and were mixed. The resulting mixture was formed into a sheet. The shelf life of rubber was determined in accordance with the electrical resistance difference by measuring the electrical resistance of the sheet. In addition, evaluation was indicated as follows:

○ indicates that the electrical resistance difference was not more than 1 digit.

Δ indicates that the electrical resistance difference was less than 1 to 2 digits.

Hardness

The rubber hardness (JIS A) of the sheet was measured and each shelf life of the rubber was evaluated by the hardness different. The evaluation was indicated as follows.

○: the hardness difference was less than 3.

Δ: the hardness difference was less than 3 and less than 5.

X: the hardness difference was not less than 5.

Image

Solid black image

The developing roll was installed in a printer and allowed to stand at 35° C./85% RH for one week. Then, a solid black image was outputted for visual evaluation. X indicates that an unprinted area of a white dot was observed while ○ indicates that no unprinted area of a white dot was observed.

Reproductivity of fine line

The developing roll was installed in a printer and allowed to stand at 35° C./85% RH for one week. Then, a character image was outputted for visual evaluation. X indicates that a fine line was broken off or the outputted image was blurred, while ○ indicates that a fine line was clear and sharp.

TABLE 1

|  | EXAMPLES | | | | |
|---|---|---|---|---|---|
|  | 1 | 2 | 3 | 4 | 5 |
| Transferability of mold | ○ | ○ | ○ | ○ | ○ |
| Hardness (Hs: JIS A) | 17 | 18 | 20 | 37 | 8 |
| Compression set (%) | 5 | 5 | 4 | 7 | 7 |
| Electrical resistance (Ω · cm) | $2 \times 10^4$ | $3 \times 10^4$ | $5 \times 10^5$ | $2 \times 10^3$ | $6 \times 10^4$ |
| Dispersion in electrical resistance | 3.3 | 2.8 | 3.0 | 3.9 | 3.1 |
| Shelf life of rubber |  |  |  |  |  |
| Electrical resistance | Δ | Δ | Δ | Δ | Δ |
| Hardness | Δ | Δ | Δ | Δ | Δ |
| Image |  |  |  |  |  |
| Solid black image | ○ | ○ | ○ | ○ | ○ |
| Reproductivity of fine line | ○ | ○ | ○ | ○ | ○ |

TABLE 2

|  | EXAMPLES | | | | |
|---|---|---|---|---|---|
|  | 6 | 7 | 8 | 9 | 10 |
| Transferability of mold | ○ | ○ | ○ | ○ | ○ |
| Hardness (Hs: JIS A) | 40 | 42 | 42 | 41 | 45 |
| Compression set (%) | 5 | 2 | 2 | 3 | 7 |
| Electrical resistance (Ω · cm) | $6 \times 10^3$ | $4 \times 10^4$ | $4 \times 10^3$ | $6 \times 10^5$ | $2 \times 10^5$ |
| Dispersion in electrical resistance | 2.5 | 3.0 | 1.0 | 1.8 | 0.9 |

TABLE 2-continued

|  | EXAMPLES | | | | |
| --- | --- | --- | --- | --- | --- |
|  | 6 | 7 | 8 | 9 | 10 |
| Shelf life of rubber | | | | | |
| Electrical resistance | Δ | Δ | Δ | Δ | Δ |
| Hardness | Δ | Δ | Δ | Δ | Δ |
| Image | | | | | |
| Solid black image | ○ | ○ | ○ | ○ | ○ |
| Reproductivity of fine line | ○ | ○ | ○ | ○ | ○ |

TABLE 3

|  | EXAMPLES | | | |
| --- | --- | --- | --- | --- |
|  | 11 | 12 | 13 | 14 |
| Transferability of mold | ○ | ○ | ○ | ○ |
| Hardness (Hs: JIS A) | 13 | 15 | 17 | 13 |
| Compression set (%) | 2 | 1 | 1 | 2 |
| Electrical resistance (Ω · cm) | $3 \times 10^4$ | $5 \times 10^4$ | $4 \times 10^4$ | $2 \times 10^4$ |
| Dispersion in electrical resistance | 2.8 | 2.7 | 2.9 | 2.6 |
| Shelf life of rubber | | | | |
| Electrical resistance | Δ | Δ | Δ | Δ |
| Hardness | ○ | ○ | ○ | ○ |
| Image | | | | |
| Solid black image | ○ | ○ | ○ | ○ |
| Reproductivity of fine line | ○ | ○ | ○ | ○ |

TABLE 4

|  | COMPARATIVE EXAMPLES | |
| --- | --- | --- |
|  | 1 | 2 |
| Transferability of mold | x | ○ |
| Hardness (Hs: JIS A) | 48 | 40 |
| Compression set (%) | 6 | 12 |
| Electrical resistance (Ω · cm) | $8 \times 10^6$ | $8 \times 10^6$ |
| Dispersion in electrical resistance | 4.3 | 4.0 |
| Image | | |
| Solid black image | x | x |
| Reproductivity of fine line | x | x |

As can be understood from the results of the above TABLES 1 to 4, each developing roll of EXAMPLES had low hardness, and the base rubber layer superior in both transferability of mold and compression set was formed so that good outputted images could be obtained due to superiority in solid black image and reproductivity of fine line. Among all, the developing rolls of EXAMPLES 11 to 14 were especially superior in compression set and shelf life (hardness) of rubber, resulting in better copied images.

On the other hand, the developing roll of COMPARATIVE EXAMPLE 1 had bad transferability of mold and bad moldability of the base rubber layer so that good outputted images could not be obtained due to inferiority both in solid black image and reproductivity of fine line. Also, the developing roll of COMPARATIVE EXAMPLE 2 had the base rubber layer inferior in compression set so that good outputted images could not be obtained due to inferiority in black solid image and reproductivity of fine line.

EXAMPLES 15 to 25

Prior to EXAMPLES 15 to 26, each silica-treated carbon black as follows was prepared.

Silica-treated Carbon Black a 500 parts of carbon black (Diablack #3030 available from Mitsubishi Chemical Corp.) were prepared and moistened with 100 parts of a mixture of methanol and water (a weight ratio of methanol:water=1:9), and then was added with 4,000 parts of water. The resulting mixture was fully dispersed with a ball mill filled with steel balls so as to become a viscous and homogeneous slurry. Next, the resulting slurry was passed through a sieve so as to be separated from the steel balls and diluted to an amount equivalent to 10,000 parts of water. Thus obtained slurry was heated to 90° C. and was added with a sodium hydroxide solution as to be pH 10.0. Next, two kinds of solutions were prepared separately as follows.

(i) 167 parts of Sodium Silicate solution was diluted by water such that the total amount became the equivalent to 1,000 parts of water.

(ii) 1,000 parts of a 2.50% sulfuric acid solution.

Thereafter, 50 parts of the diluted sodium silicate (i) were added to the thus obtained slurry having pH 10.0 within 30 seconds so that its pH was adjusted to 11.0. The mixture was stirred for 10 minutes as the pH was kept to 11.0. Then, 50 parts of the above sulfuric acid solution (ii) were added thereto within 30 seconds so that its pH was adjusted to 8.5. This process was repeated 20 times and the whole amount of the above (i) and (ii) were added. Further, the resulting mixture was stirred for one hour and a diluted sulfuric acid solution was added thereto so that its pH was adjusted to 6.5 to 7.0. Thus obtained slurry was filtered and washed until soluble salts were eliminated, and dried for obtaining the intended silica-treated carbon black ($SiO_2$ content: 10% by weight).

Silica-treated Carbon Black b

Except that the amount of Sodium Silicate (i) was changed to 83.3 parts and the amount of the 2.50% sulfuric acid solution (ii) was changed to 500 parts, silica-treated carbon black b ($SiO_2$ content: 5.0% by weight) was prepared in the same manner as previously described.

Silica-treated Carbon Black c

Except that the amount of the Sodium Silicate (i) was changed to 16.7 parts and the amount of the 2.50% sulfuric acid solution (ii) was changed to 100 parts, silica-treated carbon black c ($SiO_2$ content: 1.0% by weight) was prepared in the same manner as previously described.

EXAMPLE 15

Preparation of the Material for Forming the Base Rubber Layer

The liquid polymer composition was prepared in the above-mentioned manner by using 100 parts of liquid butadiene rubber (Liquid Isoprene Rubber, LIR-300 available from Kuraray Co., Ltd.) (Mn: 40,000, the proportion of the structural unit (α): 9.4% by weight, viscosity: 170,000 cps/25° C.) as the component (A), 5 parts of a hydrosilylation crosslinking agent represented by the above-mentioned structural formula (9) (TSF484 available from Toshiba Silicone Co., Ltd.) as the component (B), 30 ppm of a hydrosilylation catalyst (a carbonyl platinum complex, SIP 6829.0 available from Azmax Co., Ltd.) as the component (C), 10 parts of the silica-treated carbon black b, 0.05 parts of acetylene alcohol (DMHO) and 30 parts of a paraffin plasticizer (Diana Process, PS-32 available from Idemitsu Kosan Co., Ltd.).

Preparation of the Material for Forming the Intermediate Layer 100 parts of NBR (NIPOL DN401 available from Nippon Zeon Co., Ltd.), 30 parts of a conductive agent (acetylene black), 0.5 parts of stearic acid, 5 parts of ZnO (zinc white), 1 part of vulcanization accelerator BZ, 2 parts of vulcanization accelerator CZ and 3 parts of sulfur were kneaded in the above-mentioned manner. The resulting mixture was dispersed into an organic solvent, for obtaining the material for forming the intermediate layer (coating liquid).

Preparation of the Material for Forming the Surface Layer 100 parts of polyurethane elastomer (Nippollan 2304 available from Nippon Polyurethane Industry Co., Ltd.), 20 parts of carbon black and 25 parts of a curing agent (Burnock D-750 available from Dainippon Ink and Chemicals Incorporated) were kneaded in the above-mentioned method. The resulting mixture was dispersed into an organic solvent, for obtaining the material (coating liquid) for forming the surface layer.

Production of a Developing Roll

The material (liquid polymer composition) for forming the base rubber layer was filled into an injection mold in which a solid metal rod (made of SUS304 with a diameter of 10 mm) as a shaft had been installed, and then heated and crosslinked at 160° C. for 2 minutes, and then removed from the mold, for obtaining a base roll wherein a base rubber layer was formed along a peripheral surface of the shaft. Next, the intermediate layer was formed by applying the material (coating liquid) for forming the intermediate layer onto a peripheral surface of the base rubber layer. Further, the surface layer was formed by applying the material (coating liquid) onto a peripheral surface of the intermediate layer. Thus, the developing roll with a three-layer structure was obtained, which comprises the base rubber layer, the intermediate layer formed on the peripheral surface of the base rubber layer and the surface layer formed on the peripheral surface of the intermediate layer. In addition, each thickness of the base rubber layer, the intermediate layer and the surface layer is 5 mm, 25 μm and 10 μm, respectively.

EXAMPLE 16

The liquid polymer composition was prepared in the above-mentioned manner by using 100 parts of liquid isoprene-styrene copolymer rubber having a weight ratio of styrene:isoprene=81:19 (Liquid Isoprene Rubber, LIR-310 available from Kuraray Co., Ltd.) (Mn: 30,000, the proportion of the structural unit (α): 5.4% by weight, viscosity: 900,000 cps/25° C.) as the component (A), 5 parts of a hydrosilylation crosslinking agent (TSF484 available from Toshiba Silicone Co., Ltd.) as the component (B), 30 ppm of a hydrosilylation catalyst (a carbonyl platinum complex, SIP 6829.0 available from Azmax Co., Ltd.) as the component (C), 10 parts of the silica-treated carbon black (b) and 0.05 parts of acetylene alcohol (DMHO). Then, a developing roll was prepared in the same manner as EXAMPLE 15 by using this liquid polymer composition.

EXAMPLE 17

The liquid polymer composition was prepared in the above-mentioned manner by using 100 parts of liquid isoprene-styrene copolymer rubber having a weight ratio of styrene:isoprene=12.6:87.4 (Liquid Isoprene Rubber, LIR-390 available from Kuraray Co., Ltd.) (Mn: 43,000, the proportion of the structural unit (α): 9.3% by weight, viscosity: 300,000 cps/25° C.) as the component (A), 5 parts of a hydrosilylation crosslinking agent (TSF484 available from Toshiba Silicone Co., Ltd.) as the component (B), 30 ppm of a hydrosilylation catalyst (a carbonyl platinum complex, SIP 6829.0 available from Azmax Co., Ltd.) as the component (C), 10 parts of the silica-treated carbon black (b) and 0.05 parts of acetylene alcohol (DMHO). Then, a developing roll was prepared in the same manner as EXAMPLE 16 by using this liquid polymer composition.

EXAMPLE 18

The liquid polymer composition was prepared in the same manner as EXAMPLE 17, except that a hydrosilylation crosslinking agent represented by the above-mentioned structural formula (5) was used instead of the hydrosilylation crosslinking agent (TSF484, available from Toshiba Silicone Co., Ltd) of EXAMPLE 17. A developing roll was produced in the same manner as EXAMPLE 15 by using this liquid polymer composition.

EXAMPLE 19

The liquid polymer composition was prepared in the same manner as EXAMPLE 18, except that the proportion of the silica-treated carbon black (b) was changed to 5 parts. A developing roll was produced in the same manner as EXAMPLE 15 by using this liquid polymer composition.

EXAMPLE 20

The liquid polymer composition was prepared in the same manner as EXAMPLE 18, except that the proportion of the silica-treated carbon black (b) was changed to 30 parts. A developing roll was produced in the same manner as EXAMPLE 15 by using this liquid polymer composition.

EXAMPLE 21

The liquid polymer composition was prepared in the same manner as EXAMPLE 18, except that the silica-treated carbon black (a) was used instead of the silica-treated carbon black (b). A developing roll was produced in the same manner as EXAMPLE 15 by using this liquid polymer composition.

EXAMPLE 22

The liquid polymer composition was prepared in the same manner as EXAMPLE 18, except that the silica-treated carbon black (c) was used instead of the silica-treated carbon black (b). A developing roll was produced in the same manner as EXAMPLE 15 by using this liquid polymer composition.

EXAMPLE 23

The liquid polymer composition was prepared in the same manner as EXAMPLE 17, except that a hydrosilylation crosslinking agent represented by the above-mentioned structural formula (6) was used instead of the hydrosilylation crosslinking agent (TSF484 available from Toshiba Silicone Co., Ltd.) of EXAMPLE 17. A developing roll was produced in the same manner as EXAMPLE 15 by using this liquid polymer composition.

EXAMPLE 24

The liquid polymer composition was prepared in the same manner as EXAMPLE 17, except that the hydrosilylation crosslinking agent represented by the above-mentioned structural formula (7) was used instead of the hydrosilylation crosslinking agent (TSF484 available from Toshiba Silicone Co., Ltd.) of EXAMPLE 1. A developing roll was produced in the same manner as EXAMPLE 15 by using this liquid polymer composition.

EXAMPLE 25

The liquid polymer composition was prepared in the same manner as EXAMPLE 17, except that a hydrosilylation crosslinking agent represented by the above-mentioned structural formula (8) was used instead of the hydrosilylation crosslinking agent (TSF484 available from Toshiba Silicone Co., Ltd.) of EXAMPLE 17. A developing roll was produced in the same manner as EXAMPLE 15 by using this liquid polymer composition.

Each property was evaluated by using developing rolls thus obtained in EXAMPLES 15 to 26 in accordance with the following standards. These results are shown in the following TABLES 5 and 6. In addition, viscosity of each liquid polymer composition for forming the base rubber layer is also shown in the same TABLES.

Dispersibility of Carbon Black

Dispersibility of each carbon black in the material for forming the base rubber layer (liquid polymer composition) was observed by an optical microscope (OPTIPH02-POL available from Nikon Corp.) with a magnification of ×400 at both a ordinary temperature and 15° C. ○ indicates no agglomeration of not less than 5 $\mu$m and good dispersibility.

Hardness

Hardness (JIS A) of each base rubber layer of the developing roll was determined in accordance with JIS K 6301.

Electrical Resistance of the Base Rubber Layer

Electrical resistance (mean value and random dispersion in digit at 36 points) of each base rubber layer of the developing rolls was determined by using electrodes with an area of 1 mm$^2$ in accordance with JIS K 6991.

Shelf Life of Rubber

Electrical resistance

A liquid comprising the liquid polymer (component A) and the hydrosilylation cross linking agent (component B), and the silica-treated carbon black and a liquid mixture of the liquid polymer (component A), and hydrosilylation catalyst (component C) and the silica-treated carbon-black were mixed at 1:1 so as to be adjusted to each predetermined portion, separately, and each of the mixtures was allowed to stand at an ordinary temperature (25° C.) for 3 months, respectively. Thereafter, each supernatation and subsidence were withdrawn at 10% and were mixed. The resulting mixture was formed into a sheet. The shelf life of rubber was determined in accordance with the electrical resistance difference by measuring the electrical resistance of the sheet. In addition, evaluation was indicated as follows.

○ indicates that the electrical resistance difference was not more than 1 digit.

Δ indicates that the electrical resistance difference was less than 1 to 2 digits.

Hardness

The rubber hardness (JIS A) of the sheet was measured and each shelf life of the rubber was evaluated by the hardness difference. The evaluation was indicated as follows.

○: the hardness difference was less than 3.
Δ: the hardness difference was less than 3 and less than 5.
X: the hardness difference was not less than 5.

Roll Property

Density difference

The developing roll was installed in an electrophotographic apparatus and images with halftone were outputted. The density different between the maximum value and the minimum value was determined by a Macbeth densitometer. ○ indicates that the difference is less than 0.05, while Δ indicates that the difference is between 0.05 and 0.10.

Electrical resistance

Electrical resistance (mean value and random dispersion in digit at 36 points) of each base rubber layer of the developing rolls was determined by using electrodes with an area of 1 mm$^2$ in accordance with JIS K 6911.

Leak

Figure 2:
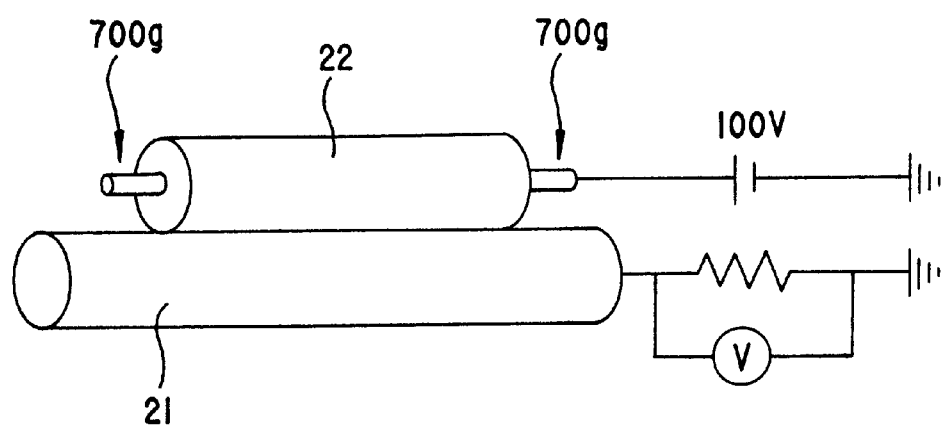
FIG. 2 is an explanatory view illustrating a method of measuring electrical resistance.

Evaluation of leak was conducted, as shown in FIG. 2, by measuring the electrical resistance of each developing roll by a metal rolling method. In the method, a developing roll 22 was contacted onto a metal roll 21 made of stainless steel and the both ends of the developing roll 22 was pressed with the load of 700 g, 100V of voltage was applied to an end of the developing roll 22 and the electrical resistance was measured. ○ indicates that the electrical resistance was not less than 10$^5$ Ω, while Δ indicates that the electrical resistance was less than 10$^5$ Ω.

TABLE 5

| | EXAMPLES | | | | |
|---|---|---|---|---|---|
| | 15 | 16 | 17 | 18 | 19 |
| Viscosity of compositions (Poise) | 2000 | 8000 | 9200 | 9500 | 7200 |
| Dispersibility of carbon black | | | | | |
| Ordinary temperature | ○ | ○ | ○ | ○ | ○ |
| 150° C. | ○ | ○ | ○ | ○ | ○ |
| Hardness (Hs) | 32 | 35 | 34 | 29 | 25 |
| Electrical resistance of base rubber | | | | | |
| Mean value (Ω) | 4.5 × 10$^7$ | 1 × 10$^7$ | 1.5 × 10$^7$ | 5 × 10$^7$ | 4 × 10$^9$ |
| Dispersion in digit | 0.8 | 0.8 | 0.7 | 0.8 | 0.9 |
| Shelf life of rubber | | | | | |
| Electrical resistance | ○ | ○ | ○ | ○ | ○ |
| Hardness | Δ | Δ | Δ | ○ | ○ |
| Roll Property | | | | | |
| Density difference | ○ | ○ | ○ | ○ | ○ |
| Electrical resistance (Ω) | 9 × 10$^8$ | 6 × 10$^8$ | 7 × 10$^8$ | 8 × 10$^8$ | 6 × 10$^8$ |
| Dispersion in digit | 0.3 | 0.3 | 0.2 | 0.3 | 0.3 |
| Leak | ○ | ○ | ○ | ○ | ○ |

TABLE 6

| | EXAMPLES | | | | | |
|---|---|---|---|---|---|---|
| | 20 | 21 | 22 | 23 | 24 | 25 |
| Viscosity of compositions (Poise) | 31000 | 17500 | 7100 | 8900 | 9700 | 9600 |
| Dispersibility of carbon black | | | | | | |
| Ordinary temperature | ○ | ○ | ○ | ○ | ○ | ○ |
| 150° C. | ○ | ○ | ○ | ○ | ○ | ○ |
| Hardness (Hs) | 42 | 35 | 26 | 30 | 40 | 31 |
| Electrical resistance of base rubber | | | | | | |
| Mean value (Ω) | 2.5 × 10⁵ | 4.5 × 10⁹ | 1.5 × 10⁷ | 8 × 10⁷ | 7 × 10⁶ | 6 × 10⁶ |
| Dispersion in digit | 0.9 | 0.6 | 1.0 | 0.7 | 0.6 | 0.6 |
| Shelf life of rubber | | | | | | |
| Electrical resistance | ○ | ○ | ○ | ○ | ○ | ○ |
| Hardness | ○ | ○ | ○ | ○ | ○ | ○ |
| Roll Property | | | | | | |
| Density difference | ○ | ○ | Δ | ○ | ○ | ○ |
| Electrical resistance (Ω) | 2 × 10⁸ | 8 × 10⁸ | 5 × 10⁸ | 6 × 10⁸ | 1 × 10⁸ | 1.2 × 10⁸ |
| Dispersion in digit | 0.3 | 0.2 | 0.3 | 0.2 | 0.3 | 0.3 |
| Leak | ○ | ○ | ○ | ○ | ○ | ○ |

As can be understood from the results of TABLES 5 and 6, EXAMPLES were good in dispersibility of carbon black in the base rubber layer and had a small dispersion in electrical resistance so that no blurs occurred in outputted images and shelf life of rubber was good.

EFFECT OF THE INVENTION

As described above, according to the present invention, the base rubber layer is formed by using the specific composition (liquid polymer composition) comprising the liquid polymer (component A) having a structural unit (α) derived from at least one of butadiene and isoprene and having an alkenyl group in a side chain thereof. Therefore, the alkenyl group of the structural unit (α) in the liquid rubber (component A) becomes a crosslinking site and is present in a molecule thereof as a so-called pendant form so that the base rubber layer as a crosslinked mold comes to have a dense net structure due to the effects by the hydrosilylation crosslinking agent (component B) and the hydrosilylation catalyst (component C), resulting in superior compression set. As a result, good copied images can be obtained.

Further, where the specific hydrosilylation crosslinking agent (component B) represented by a general formula selected from the group consisting of the above general formulae (1) to (3) is used, compatibility and miscibility with the liquid polymer (component A) is improved so that compression set and shelf life (hardness) of the liquid rubber are improved.

Still further, where the liquid rubber (component A) has the structural unit (β) derived from styrene along with the structural unit (α), dispersibilty of carbon black can be improved, dispersion in electrical resistance lessens and also it is not necessary to conduct corona discharge treatment, primer treatment or the like on the surface of the shaft, which is required where the liquid silicone rubber is used as a material for forming the base rubber layer.

Even further, where specific conductive carbon black is used for forming the base rubber layer along with the components (A) to (C), a crosslinking reaction can satisfactorily occur.

Even still further, where carbon black having silica fixed on the surface thereof is used for forming the base rubber layer along with the components (A) to (C), dispersibility of the carbon black in the liquid polymer (component A) is improved, dispersion in electrical resistance lessens so that shelf life (electrical resistance) of liquid rubber is improved, resulting in more excellent copied images.

What is claimed is:

1. A conductive roll comprising a shaft and a base rubber layer formed on a peripheral surface of the shaft, the base rubber layer formed of a composition containing the following components (A) to (C):

(A) a liquid polymer having a structural unit (α) derived from at least one of butadiene and isoprene and having an alkenyl group in a side chain thereof;

(B) a hydrosilylation crosslinking agent; and (C) a hydrosilylation catalyst.

2. The conductive roll according to claim 1, wherein the component (B) is represented by at least one general formula selected from the group consisting of the following general formulae (1) to (3):

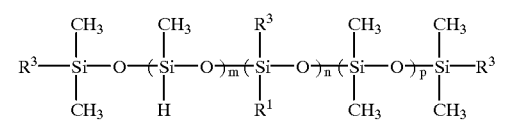
(1)

wherein $R^1$ is a hydrocarbon group having 2 to 20 carbon atoms, $R^2$ is a hydrocarbon group having 1 to 20 carbon atoms, $R^3$, which may be the same or different for each unit, is a hydrogen atom or a methyl group, and m, n and p satisfy $2 \leq m+n+p \leq 200$ wherein m is a positive number of 1 or more, n is a positive number of 1 or more and p is 0 or a positive number,

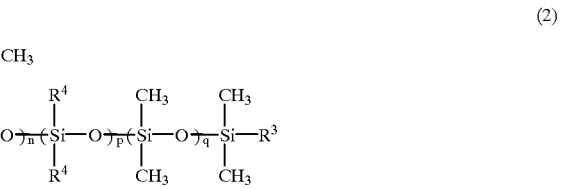
(2)

wherein $R^1$ is a hydrocarbon group having 2 to 20 carbon atoms, $R^3$, which may be the same or different for each unit, is a hydrogen atom or a methyl group, $R^4$, which may be the same or different for each unit, is a hydrocarbon group having 1 to 20 carbon atoms, and m, n p, and q satisfy $1 \leq m+n+p+q \leq 200$ wherein m is 0 or a positive number, n is a positive number of 1 or more, p is 0 or a positive number and q is 0 or a positive number,

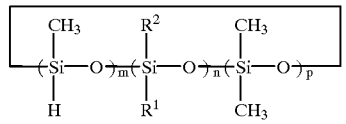
(3)

wherein $R^1$ is a hydrocarbon group having 2 to 20 carbon atoms, $R^2$ is a hydrocarbon group having 1 to 20 carbon atoms and m, n and p satisfy $3 \leqq m+n+p \leqq 50$ wherein m is a positive number of 2 or more, n is a positive number of 1 or more and p is 0 or a positive number.

3. The conductive roll according to claim 1, wherein the component (A) has the structural unit (α) and a structural unit (β) derived from styrene.

4. The conductive roll according to claim 2, wherein the component (A) has the structural unit (α) and a structural unit (β) derived from styrene.

5. The conductive roll according to claim 1, wherein the composition for forming the base rubber layer contains a conductive carbon black having an ash content of not more than 0.3% by weight.

6. The conductive roll according to claim 2, wherein the composition for forming the base rubber layer contains a conductive carbon black having an ash content of not more than 0.3% by weight.

7. The conductive roll according to claim 3, wherein the composition for forming the base rubber layer contains a conductive carbon black having an ash content of not more than 0.3% by weight.

8. The conductive roll according to claim 1, wherein the composition for forming the base rubber layer contains carbon black having silica fixed on a surface of the carbon black.

9. The conductive roll according to claim 2, wherein the composition for forming the base rubber layer contains carbon black having silica fixed on a surface of the carbon black.

10. The conductive roll according to claim 3, wherein the composition for forming the base rubber layer contains carbon black having silica fixed on a surface of the carbon black.

* * * * *

UNITED STATES PATENT AND TRADEMARK OFFICE
CERTIFICATE OF CORRECTION

PATENT NO.    : 6,146,320
DATED         : November 14, 2000
INVENTOR(S)   : Yoshikawa et al.

It is certified that error appears in the above-identified patent and that said Letters Patent is hereby corrected as shown below:

Column 24, claim 2,
Formula (1), change,

"
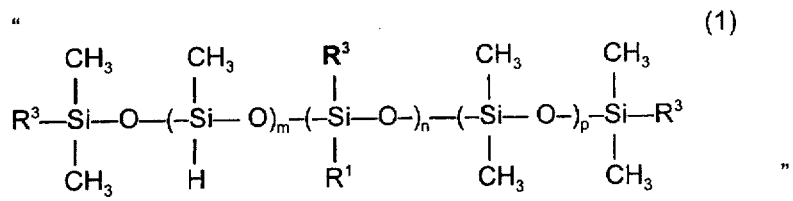
"

to be

--
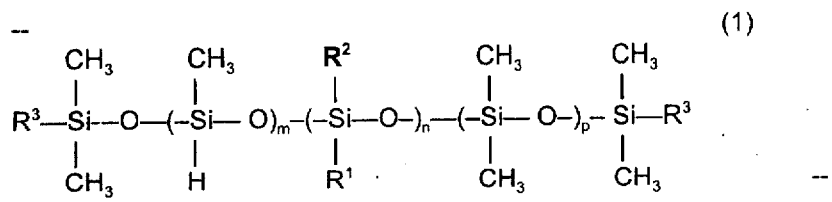
--

UNITED STATES PATENT AND TRADEMARK OFFICE
CERTIFICATE OF CORRECTION

PATENT NO. : 6,146,320
DATED : November 14, 2000
INVENTOR(S) : Yoshikawa et al.

It is certified that error appears in the above-identified patent and that said Letters Patent is hereby corrected as shown below:

Columns 23 and 24, claim 2,
Formula (2), change,

"
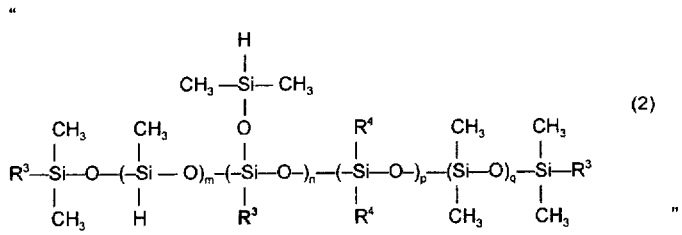
"

to be

--
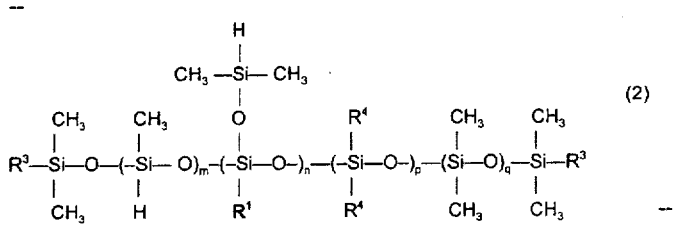
--

Signed and Sealed this

Twenty-sixth Day of March, 2002

Attest:

JAMES E. ROGAN
*Attesting Officer*    *Director of the United States Patent and Trademark Office*